(12) United States Patent
Mager

(10) Patent No.: US 7,468,454 B2
(45) Date of Patent: Dec. 23, 2008

(54) AMINO-FUNCTIONAL POLYURETHANE PREPOLYMERS AND A PROCESS FOR THEIR PREPARATION

(75) Inventor: Michael Mager, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 579 days.

(21) Appl. No.: 11/171,709

(22) Filed: Jun. 30, 2005

(65) Prior Publication Data

US 2006/0004173 A1    Jan. 5, 2006

(30) Foreign Application Priority Data

Jul. 5, 2004    (DE)    ........................ 10 2004 032 417

(51) Int. Cl.
C07C 269/02    (2006.01)
C07C 269/06    (2006.01)

(52) U.S. Cl. ............... 560/25; 252/182.13; 252/182.22; 252/182.23; 525/523; 525/528; 528/28; 528/59; 528/68; 528/76; 528/87; 528/111; 528/120; 528/121; 528/122; 528/123; 528/407; 560/19; 560/26; 560/115; 560/155; 560/158; 560/159

(58) Field of Classification Search ................. 525/523, 525/528; 528/28, 59, 68, 76, 87, 111, 120, 528/121, 122, 123, 407; 560/25, 26, 115, 560/158, 19, 155, 159; 252/182.13, 182.22, 252/182.23; 564/461, 511, 512

See application file for complete search history.

(56) References Cited

U.S. PATENT DOCUMENTS 3,993,708 A    11/1976    Brinkmann et al.
4,224,417 A    9/1980    Hajek et al. .................. 521/166
5,283,364 A    2/1994    Rasshofer et al. ........... 564/393

FOREIGN PATENT DOCUMENTS

| DE | 29 48 419 | 8/1981 |
| DE | 30 35 639 | 4/1982 |
| GB | 1117494 | 6/1968 |
| JP | 61-215397 | 9/1986 |
| JP | 62-74919 | 4/1987 |

*Primary Examiner*—Rabon Sergent
(74) *Attorney, Agent, or Firm*—Connolly Bove Lodge & Hutz LLP

(57) ABSTRACT

The present invention relates to a process for preparing amino-functional polyurethane prepolymers by a) preparing an NCO-functional polyurethane prepolymer by reacting an excess of one or more di- and/or polyisocyanates with at least one isocyanate-reactive compound having a functionality of at least 1.5, b) reacting the free NCO groups of the resulting polyurethane prepolymer with at least one compound containing one or more silanol groups to obtain the corresponding silylurethanes, and then c) converting the silylurethanes to amino-functional polyurethane prepolymers by hydrolysis and/or alcoholysis with decarboxylation.

The present invention also relates coatings, adhesives, sealants, casting compounds or moldings obtained from these amino-functional polyurethene prepolymers. Finally, the present invention relates to reactive systems containing the amino-functional polyurethane prepolymers, compounds containing on average more than one oxirane group per molecule, and optionally organic amines and additives.

8 Claims, No Drawings

AMINO-FUNCTIONAL POLYURETHANE PREPOLYMERS AND A PROCESS FOR THEIR PREPARATION

BACKGROUND OF THE INVENTION

1. Field of the Invention

The present invention relates to amino-functional polyurethane prepolymers, a process for their preparation, and to their use for modifying and preparing epoxy resins and polyurethanes.

2. Description of the Prior Art

Coatings formed from epoxy resins are distinguished by high hardness, good chemical resistance and outstanding metal adhesion. Solvent-free epoxy resin formulations are generally prepared using low molecular weight epoxides in combination with monomeric diamines, since components of higher molecular weight would result in a viscosity that is much too high for processing. Because of the high crosslinking density, however, the coatings produced from these epoxy resin formulations are mostly too brittle and unsuitable for practical use.

The brittleness of the aforementioned epoxy resins can be reduced by adding suitable plasticizers, but the result of their addition is a ternary system, associated with a proportionately higher complexity in formulation. Also, the monomeric diamines customarily employed have a volatility which makes them substances difficult to handle, requiring particular protective measures.

Proposals have therefore been made to flexibilize these epoxy resins by using amino-functional polyurethane prepolymers, which can be obtained, for example, by hydrolyzing the corresponding ketimines (U.S. Pat. No. 3,993,708, DE-A 2 546 536). Other processes for preparing amino-functional polyurethane prepolymers include the hydrolysis of isocyanate-functional polyurethane prepolymers in the presence of strong bases (DE-A 2 948 419) or in mixtures of water with specific solvents such as dimethylformamide (DMF) (EP-A 0 219 035); the reaction of NCO-functional prepolymers with tertiary alcohols and subsequent thermal breakdown (DE-A1 270 046); and the hydrogenolysis of O-benzyloxyurethanes (DE-A 3 035 639).

The aforementioned processes have the disadvantage, however, that coupling products, such as ketones in the ketimine process, must first be removed, which is costly and inconvenient, or the actual product must be extracted from an aqueous phase (hydrolysis process). The thermolysis of tertiary alkylurethanes is not a very gentle method and leads to strongly coloured products. The blocking agent in the hydrogenolysis of O-benzyloxyurethanes is decomposed to form toluene and carbon dioxide and thus cannot be used again in the reaction.

JP-A 61215397 describes reaction products of organic isocyanates (e.g. tolylene diisocyanate) and arylsilanols such as triphenylsilanol that can be used in the customary fashion as (reversibly) blocked isocyanates.

JP-A 62074919 describes aliphatic isocyanates (e.g. hexane 1,6-diisocyanate), also blocked with triphenylsilanol, which can be used, in combination with defined catalysts, as hardeners for epoxides. It does not report the in situ formation or preparation of amines.

The possibility of the hydrolytic breakdown of the silylurethanes described (i.e., the reaction of the silylurethanes with water) involving elimination of silanol and $CO_2$, was not recognized in the two stated applications.

It has now been found that amino-functional polyurethane prepolymers are obtained smoothly and under mild conditions from the corresponding prepolymers containing silylurethane groups by means of hydrolytic breakdown. The resulting products are notable for minimal color and low viscosity.

SUMMARY OF THE INVENTION

The present invention relates to a process for preparing amino-functional polyurethane prepolymers by a) preparing an NCO-functional polyurethane pre polymer by reacting an excess of one or more di- and/or polyisocyanates with at least one isocyanate-reactive compound having a functionality of at least 1.5, b) reacting the free NCO groups of the resulting polyurethane prepolymer with at least one compound containing one or more silanol groups to obtain the corresponding silylurethanes, and then c) converting the silylurethanes to amino-functional polyurethane prepolymers by hydrolysis and/or alcoholysis with decarboxylation.

The present invention also relates to coatings, adhesives, sealants, casting compounds or moldings obtained from these amino-functional polyurethene prepolymers. The present invention also relates to polyurethanes comprising urea groups produced by reaction of the amino-functional polyurethane prepolymers with polyisocyanates. Finally, the present invention relates to reactive systems containing the amino-functional polyurethane prepolymers, compounds containing on average more than one oxirane group per molecule, and optionally organic amines and additives.

DETAILED DESCRIPTION OF THE INVENTION

Suitable polyisocyanates for preparing the prepolymers of the invention include all aliphatic, cycloaliphatic, aromatic or heterocyclic organic di- and polyisocyanates having at least two isocyanate groups per molecule and also mixtures thereof. Examples include aliphatic di- or triisocyanates such as butane 1,4-diisocyanate, pentane 1,5-diisocyanate, hexane 1,6-diisocyanate (hexamethylene diisocyanate, HDI), and 4-isocyanatomethyloctane 1,8-diisocyanate (triisocyanatononane, TIN); cycloaliphatic polyisocyanates such as 4,4'-methylenebis(cyclohexyl isocyanate) (Desmodur®W, Bayer Material Science AG, Leverkusen), 3,5,5-trimethyl-1-isocyanato-3-isocyanatomethylcyclohexane (isophorone diisocyanate, IPDI) and $\omega,\omega'$-diisocyanato-1,3-dimethylcyclohexane ($H_6XDI$); and aromatic polyisocyanates such as naphthalene 1,5-diisocyanate, 4,4'-, 2,4'- and 2,2'-diisocyanatodiphenylmethane (MDI) or crude MDI, diisocyanatomethylbenzene (toluene diisocyanate, TDI), especially the 2,4- and the 2,6 isomer and mixtures of the two isomers, and 1,3-bis(isocyanato-methyl)benzene (XDI).

Preferred polyisocyanates are aliphatic polyisocyanates such as butane 1,4-diisocyanate, pentane 1,5-diisocyanate, hexane 1,6-diisocyanate(hexamethylene diisocyanate, HDI), and 4-isocyanatomethyloctane 1,8-diisocyanate (triisocyanatononane, TIN); and cycloaliphatic polyisocyanates such as 4,4'-methylenebis(cyclohexyl isocyanate) (Desmodur®W, Bayer Material Science A G, Leverkusen), 3,5,5-trimethyl-1-isocyanato-3-isocyanatomethylcyclohexane (isophorone diisocyanate, IPDI) and $\omega.\omega'$-diisocyanato-1,3-dimethylcyclohexane ($H_6XDI$).

Suitable polyisocyanates also include the known polyisocyanate adducts (derivatives) prepared from the aforementioned isocyanates and containing biuret, isocyanurate, iminooxadiazinedione, uretone, allophanate and/or urethane groups.

Suitable isocyanate-reactive compounds used in step a) are the polyhydroxy compounds that are known from polyurethane chemistry and have an OH functionality >1.5. Examples include low molecular weight diols (such as 1,2-ethanediol, 1,3- and 1,2-propanediol, and 1,4-butanediol), triols (such as glycerol and trimethylolpropane) and tetraols (such as pentaerythritol); and also higher molecular weight polyether polyols, polyester polyols, polycarbonate polyols and polythioether polyols. Preferred polyhydroxy compounds are the polyether polyols.

"Low molecular weight" compounds are those having number-average molecular weights below 500 g/mol, preferably 62-499 g/mol. "Higher molecular weight" compounds are those having number-average molecular weights of 500-100,000 g/mol.

Particularly preferred isocyanate-reactive compounds are polyether polyols having an OH functionality $\geq 1.9$, preferably $\geq 1.95$, and having a number-average molecular weight from 500 to 20,000 g/mol, preferably 1000 to 12,000 g/mol and more preferably 2000 to 6000 g/mol, which are obtained in known manner by alkoxylating -suitable starter molecules.

Especially preferred isocyanate-reactive compounds are polyether polyols having an unsaturated end group content of less than or equal to 0.02 milliequivalent per gram of polyol, preferably less than or equal to 0.015 milliequivalent per gram of polyol and more preferably less than or equal to 0.01 milliequivalent per gram of polyol (determination method: ASTM D2849-69) and also a molecular weight distribution (polydispersity; $PD=M_w/M_n$) of 1.0 to 1.5. These polyether polyols are prepared in known manner in accordance with, for example, U.S. Pat. No. 5,158,922 (e.g. Example 30) or EP-A 0 654 302 (p. 5, 1.26 to p. 6, 1.32) by alkoxylating suitable starter molecules, in particular using double metal cyanide catalysts (DMC catalysis).

Examples of suitable starter molecules for preparing the aforementioned polyether polyols are previously mentioned low molecular weight polyhydroxy compounds, water, organic polyamines having at least two N—H bonds, and mixtures of these starter molecules. Alkylene oxides suitable for the alkoxylation are, in particular, ethylene oxide and/or propylene oxide, which for the alkoxylation can be used sequentially or in admixture.

Preferred starter molecules for preparing the polyether polyols are ethylene glycol, propylene 1,3-glycol, butane-1, 4-diol, hexane-1,6-diol, neopentyl glycol, 2-ethyl-hexane-1, 3-diol, glycerol, trimethylolpropane, pentaerythritol, low molecular weight, hydroxyl-containing esters of the preceding starter molecular with dicarboxylic acids, and low molecular weight ethoxylation or propoxylation products of the preceding starter molecules. It is also possible to use mixtures of the aforementioned compounds.

In step b) of the process of the invention silanols are used that correspond to formula (I)

$$(HO)_a SiR_{4-a} \quad (I)$$

wherein

R represents identical or different, optionally branched and/or substituted $C_1$-$C_8$ alkyl radicals or phenyl radicals and a is 1 or 2.

Preferred silanols of formula (I) are those in which R is as defined above and a is 1. For the formation of the silyl urethane in step c) it is especially preferred to use triphenylsilanol.

In the process of the invention the polyisocyanates used in step a) are always used in excess in relation to the isocyanate-reactive groups of the isocyanate-reactive compounds used in step a). After the end of the reaction the unreacted polyisocyanates can be optionally removed from the reaction mixture by distillation, for example, by thin-film distillation.

In step a) the molar ratio of isocyanate-reactive groups of the isocyanate-reactive compounds to the NCO groups of the di- or polyisocyanates is preferably 1:1.5 to 1:20, more preferably 1:1.8 to 1:5 and most preferably 1:1.95 and 1:2.05.

The NCO-containing polyurethane prepolymers are generally prepared at 20 to 140° C., preferably at 40 to 100° C. Optionally the reaction can also be carried out in the presence of known (urethanization) catalysts, for example, tin compounds such as dibutyltin dilaurate and tin dioctoate, and tertiary amines such as 1,4-diazabicyclooctane (DABCO).

Additionally the preparation can be carried out in suitable solvents, preferably inert solvents, such as ethyl acetate, butyl acetate, methoxypropyl acetate, methyl ethyl ketone, methyl isobutyl ketone, toluene, xylene, aromatic or (cyclo)aliphatic hydrocarbon mixtures and mixtures thereof. Preferably, however, the reaction is carried out without the use of solvents.

The subsequent preparation of the silylurethanes in step b) takes place by reacting the NCO-containing polyurethane prepolymers obtained in step a) with the silanols.

The amount of silanols used in b) is generally chosen so that all of the free isocyanate groups of the prepolymer obtained in step a) are reacted to the silylurethane (molar ratio of Si—OH groups to NCO groups: at least 1). A slight excess of the silanol can be appropriate in order to ensure complete reaction of all isocyanate groups. In general, however, the excess is not more than 20 mol %, preferably not more than 15 mol % and more preferably not more than 10 mol %, based on the isocyanate groups to be silylated.

The conversion reaction of the prepolymers with the silanols of formula (I) is carried out in the same way as the prepolymer preparation. This means that it is carried out at temperatures of 20 to 140° C., optionally in the presence of known urethanization catalysts, and optionally using (inert) solvents.

In the last step the hydrolysis or alcoholysis takes place, with the silylurethanes being broken down to the corresponding amino-functional polyurethane prepolymers, with decarboxylation.

For the breakdown of the silylurethanes water or an alcohol is added, generally at least stoichiometrically, i.e. in a molar ratio of at least 1:1, based on the silylurethane groups, preferably in excess.

Suitable alcohols include all primary, secondary and tertiary aliphatic $C_1$-$C_{30}$ alcohols. Preferred are primary $C_1$-$C_8$ alcohols. Examples include methanol, ethanol, propanol, n-butanol, n-pentanol and hexanol.

During hydrolysis the starting silanols are reformed, and can then be used again for the formation of silylurethanes. During alcoholysis the initial products are alkoxy-organosilanes, which must first be converted with water into the corresponding silanols, before they can be used again in the process of the invention.

In one preferred embodiment the di- or polyisocyanate is charged to a suitable reaction vessel and heated with stirring to 60 to 100° C. Then, after the desired temperature has been reached and with stirring, the isocyanate-reactive component is added and stirring is continued until the actual NCO content of the polyurethane prepolymer is at or slightly below the theoretical NCO content. Subsequently, at a temperature within the ranges specified above in connection with the formation of prepolymer, the silanol is added in step b) and the mixture is heated until the free isocyanate group content is less than 0.5% by weight, preferably less than 0.2% by weight and more preferably less than 0.1% by weight. The resulting blocked polyurethane prepolymer is optionally dissolved in a solvent and then hydrolyzed at temperatures of 0 to 30° C. by the addition of stoichiometric amounts of water. The (re-formed) silanol can thereafter be separated, along with the solvent, if used, from the product by means of suitable methods (such as filtration or distillation).

Alternatively, the process of the invention can also be conducted such that first the isocyanate-reactive compounds are introduced and are then mixed with the polyisocyanates.

The amino-functional polyurethane prepolymers prepared in accordance with the invention are distinguished by particularly minimal color and low viscosity when compared with similar polymers prepared by other processes. Typically they have viscosities of 500 to 200,000 mPa.s (23° C.; measured with a rotational viscometer), preferably 500 to 50,000 mPa.s and more preferably 500 to 10,000 mPa.s.

The amino-functional polyurethane prepolymers obtained in accordance with the invention preferably have number-average molecular weights of 500 to 25,000 g/mol, preferably 1000 to 10,000 g/mol and more preferably 1000 to 5000 g/mol. Therefore they can be used, for example, to particularly good effect in low-solvent or solvent-free reactive systems, since due to their viscosity, they provide such systems with particularly advantageous processing properties, such as good flowability and levelling properties, thereby allowing particularly high-value and uniform coatings or adhesive bonds to be obtained.

Preferred reactive systems contain the amino-functional polyurethane prepolymers prepared in accordance with the invention and also polyols, polyisocyanates or epoxides.

Reactive systems with a particularly low viscosity, based on epoxides, and their preparation are further provided by the invention. The epoxide-based reactive systems of the invention comprise A) one or more amino-functional polyurethane prepolymers according to the invention, B) compounds containing on average more than one oxirane group per molecule, C) optionally one or more low molecular weight organic amines having at least two primary amino groups, and D) optionally additives.

Suitable compounds for use as component B) include all compounds containing oxirane groups, such as epoxy resins that contain on average more than one epoxide group per molecule. Examples include glycidyl ethers of polyhydric alcohols such as butanediol, hexanediol, glycerol, hydrogenated diphenylolpropane; and polyhydric phenols such as resorcinol, 2,2-diphenylolpropane (bisphenol A), diphenylolmethane (bisphenol F) or phenol-aldehyde condensates. It is also possible to use glycidyl esters of polybasic carboxylic acids, such as hexahydrophthalic acid and dimerized fatty acid.

Preferred are liquid epoxy resins based on epichlorohydrin and 2,2-diphenylolpropane (bisphenol A) or diphenylolmethane (bisphenol F), and mixtures thereof.

Optionally it is possible to use monofunctional epoxide compounds to lower the viscosity of the mixtures and improve the processing. Examples include aliphatic and aromatic glycidyl ethers such as butyl glycidyl ether and phenyl glycidyl ether; glycidyl esters such as Versatic acid glycidyl ester; and epoxides such as styrene oxide or 1,2-epoxydodecane.

In the reactive systems of the invention there are preferably 0.2 to 1.0, preferably 0.5 to 1.0, primary amino groups of component A) per epoxide group of component B).

In order to improve the mechanical properties it is additionally possible, besides the amino-functional polyurethane prepolymers, to add low molecular weight amines (component C)) as well. These are generally polyamines which have at least two primary amino groups per molecule and may also have secondary amino groups, and preferably have a number-average molecular weight of 60 to 499 g/mol. Suitable examples include ethylenediamine, 1,2- and 1,3-diaminopropane, 1,4-diaminobutane, 2,2,4- and/or 2,4,4-trimethylhexamethylenediamine, the isomeric xylylenediamines, 1,2- and 1,4-diaminocyclohexane, 4,4'-diaminodicyclohexylmethane, 1,3-diamino-cyclopentane, 4,4'-diaminodicyclohexyl sulphone, 4,4'-diamino-1,3-dicyclohexyl-propane, 4,4'-diamino-2,2-dicyclohexylpropane, 3,3'-dimethyl-4,4'-diaminodicyclohexylmethane, 3-aminomethyl-3,3,5-trimethylcyclohexylamine(isophoronediamine), 3(4)-aminomethyl-1-methylcyclohexylamine, technical-grade bisaminomethyltricyclodecane and polyamines which, in addition to at least two primary amino groups, also contain secondary amino groups, such as diethylenetriamine or triethylenetetramine.

Preferred are polyamines, especially diamines having the preferred molecular weights, which contain one or more cycloaliphatic rings. These include 1,2- and 1,4-diaminocyclohexane, 4,4'-diaminodicyclohexylmethane, 1,3-diaminocyclopentane, 4,4'-diaminodicyclohexyl sulphone, 4,4'-diamino-1,3-dicyclohexylpropane, 4,4'-diamino-2,2-dicyclohexylpropane, 3,3'-dimethyl-4,4'-diaminodicyclohexylmethane, 3-aminomethyl-3,3,5-trimethylcyclohexylamine(isophoronediamine, 3(4)-aminomethyl-1-methyl cyclohexylamine and technical-grade bisaminomethyltricyclodecane.

It is also possible to use as component C) adducts prepared by reacting an excess of the stated polyamines with the epoxy resins specified above.

Polyamide resins may also be used as component C). Polyamide resins of this kind, which include polyaminoamides and polyaminoimidazolines, are sold for example, by Henkel KGaA, Dusseldorf, DE under the trade name "Versamid®".

It is also possible to use mixtures of the previously mentioned polyamines as component C).

To prepare ready-to-use mixtures it is possible to admix the reactive systems with component D), which includes known additives such as fillers, solvents, levelling assistants, pigments, reaction accelerants (catalysts) and viscosity regulators. Examples include reaction accelerants such as salicylic acid, bis(dimethylaminomethyl)-phenol and tris(dimethylaminomethyl)phenol; fillers such as sand, rock flour, silica, asbestos flour, kaolin, talc, metal powders, tar, pitch, asphalts, cork scraps and polyamides; plasticizers such as phthalates; and other viscosity regulators such as benzyl alcohol.

Optionally, it is possible to add to the ready-to-use mixture up to 20% by weight, preferably up to 10% by weight and more preferably up to 5% by weight, of a solvent or paint solvent of the type previously described above, for application purposes. If solvents are to be added at this point, then it is also possible if solvents are used during the preparation of the PU prepolymers of the invention, to dispense with the removal of the solvent. However, solvent-free ready-to-use mixtures are preferred.

Moreover, the polyurethane prepolymers according to the invention exhibit outstanding compatibility with component B) and optionally C), since the reaction of epoxy resin/amine can be adjusted such that the reactive systems produce a compatible blend at room temperature.

The invention further provides for the use of the reactive systems of the invention for preparing or producing coatings, adhesives, sealants, casting compounds and moldings for all fields of application requiring effective adhesion, chemical resistance, and high impact strength, in conjunction with effective flexibility and elasticity. The systems of the invention are especially suitable for use as anti-corrosion coatings. Particularly when subjected to aggressive media, such as in the case of ballast tank coating, the systems are distinguished by good wet adhesion and good adhesion under cathodic protection conditions.

The invention is further illustrated but is not intended to be limited by the following examples in which all parts and percentages are by weight unless otherwise specified.

EXAMPLES

In the following examples all percentages are by weight unless indicated otherwise.

The NCO contents of the isocyanate-functional prepolymers were determined by means of back-titration of di-n-butylamine added in excess using 0.1 N hydrochloric acid and bromophenol blue indicator, the sample having been dissolved in about 50 ml of acetone.

In the reaction with triphenylsilanol the reaction was monitored by means of infrared (IR) spectroscopy (NCO-band at 2270 cm$^{-1}$).

The amine contents were determined by titration with 0.1 N hydrochloric acid, the sample having been dissolved in about 50 ml of acetone, using bromophenol blue indicator.

Example 1 a) Preparation of an isocyanate-functional polyurethane prepolymer:

With stirring, hexamethylene diisocyanate (10 eq) and a polypropylene glycol (1 eq), which had been prepared by means of DMC catalysis (base-free) and had a number average molecular weight of 2000 g/mol and an OH number of 56, were heated at 100° C. until the theoretical NCO content of 20.7% by weight was reached. Following addition of 200 ppm of dibutyl phosphate the excess hexamethylene diisocyanate was then removed by thin-film distillation (140° C., about 0.5 mbar) to give an isocyanate-functional prepolymer having an NCO content of 3.3% by weight.

b) Reaction with triphenylsilanol:

82.2 g of the NCO-functional prepolymer obtained according to a) were heated to 75° C. with stirring together with 17.8 g of triphenylsilanol. Then 100 ppm of dibutyltin(II) dilaurate were added and the reaction mixture was stirred until an NCO band was no longer visible in the IR spectrum.

c) Hydrolysis to give an amino-functional polyurethane prepolymer:

1.74 g of the product obtained according to b) were dissolved with stirring in 100 ml of acetone and a large excess of water (about 10 ml) was added. Titration indicated an NH$_2$ content of 0.98% by weight. (Theoretical NH2 content: 1.03%, corresponding to a silylurethane group conversion of 95%).

Example 2 a) Preparation of an isocyanate-functional polyurethane prepolymer and reaction with triphenylsilanol:

17.2 g of hexamethylene diisocyanate and 20 mg of dibutyltin(II) dilaurate were heated to 80° C. with stirring. Then, over a period of 5 hours, 204.5 g of a difunctional polypropylene glycol, which had been prepared by means of DMC catalysis (base-free) and had a number average molecular weight of 4000 g/mol and an OH number of 28, were added. After an NCO content of 1.54% (theoretical NCO content: 1.9%) had been reached, 28.3 g of triphenylsilanol and a further 20 mg of dibutyltin(II) dilaurate were added and the reaction mixture was stirred at 80° C. until an NCO band was no longer visible in the IR.

b) Hydrolysis to give an amino-functional polyurethane prepolymer:

The amount of the silylurethane from step a) set forth in the table below was dissolved with stirring in an amount of acetone sufficient to give a 25% strength solution; thereafter, at ambient temperature, the stated amount of deionized water was added. After stirring for 15 minutes the NH2 content was determined, and then the sample was freed from the acetone on a rotary evaporator and again the NH$_2$ content was determined. The results are also set forth in Table 1.

TABLE 1

| Silylurethane from a) [g] | Deionized water | Eq ratio | NH$_2$ content [%]/25% | NH$_2$ content [%]/pure |
|---|---|---|---|---|
| 8.22 | 0.24 | 1:5 | 0.13 | 0.49 |
| 37.45 | 0.22 | 1:1 | 0.13 | 0.49 |
| 37.42 | 0.33 | 1:1.5 | 0.13 | 0.47 |

(Theoretical NH$_2$ content: 0.52%, corresponding to a silylurethane group conversion of 94%).

Example 3 a) Preparation of an isocyanate-functional polyurethane prepolymer and reaction with triphenylsilanol:

262.0 g of a polyethylene glycol having an OH number of 110 and a molecular weight of 1000 g/mol were first stirred at 100° C. for 8 hours under vacuum (20 mbar) in order to remove residues of water. Thereafter 88.0 g of hexamethylene diisocyanate were added and the mixture was heated at 100° C. with stirring until an NCO content of 6.28% by weight was reached.

349.9 g of the resulting prepolymer were admixed with 50 mg of dibutyltin(II) dilaurate and 144.6 g of triphenylsilanol and the reaction mixture was stirred at 80° C. until an NCO band was no longer visible in the IR.

b) Hydrolysis to give an amino-functional polyurethane prepolymer and recovery of the triphenylsilanol used:

3.84 g of the silylated polyurethane prepolymer were admixed at ambient temperature with 150 g of water and stirred for 1 hour. The colorless precipitate was isolated by filtration, washed twice with 10 ml of water and subsequently dried in an oven (105° C., 4 hours). 1.07 g of triphenylsilanol was recovered, corresponding to 95% of theoretical.

The initially clear filtrate was freed from volatile constituents on a rotary evaporator, after which, 2.65 g of a colorless wax were obtained (99% of theory). Titration indicated an NH$_2$ content of 1.67% by weight, corresponding to 75% of theoretical.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing an amino-functional polyurethane prepolymer which comprises a) preparing an NCO-functional polyurethane prepolymer by reacting one or more di- and/or polyisocyanates with at least one isocyanate-reactive compound having a functionality of at least 1.5,
b) reacting the free NCO groups of the resulting polyurethane prepolymer with at least one compound containing one or more silanol groups to give the corresponding silylurethane, and then
c) converting the silylurethane to an amino-functional polyurethane prepolymer by hydrolysis and/or alcoholysis with decarboxylation.

2. The process of claim 1 wherein said di- and/or polyisocyanates comprise aliphatic and/or cycloaliphatic polyisocyanates.

3. The process of claim 1 wherein said isocyanate-reactive compound comprises a polyether.

4. The process of claim 2 wherein said isocyanate-reactive compound comprises a polyether.

5. The process of claim 1 wherein said compound containing one or more silanol groups comprises triphenylsilanol.

6. The process of claim 2 wherein said compound containing one or more silanol groups comprises triphenylsilanol.

7. The process of claim 3 wherein said compound containing one or more silanol groups comprises triphenylsilanol.

8. The process of claim 4 wherein said compound containing one or more silanol groups comprises triphenylsilanol.

* * * * *